(12) United States Patent
Mizutani

(10) Patent No.: US 11,482,258 B2
(45) Date of Patent: Oct. 25, 2022

(54) HUMIDITY CONTROL FILTER AND MAGNETIC RECORDING/REPRODUCING APPARATUS

(71) Applicants: Kabushiki Kaisha Toshiba, Tokyo (JP); Toshiba Electronic Devices & Storage Corporation, Tokyo (JP)

(72) Inventor: Akiyo Mizutani, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/181,042

(22) Filed: Feb. 22, 2021

(65) Prior Publication Data
US 2022/0028430 A1 Jan. 27, 2022

(30) Foreign Application Priority Data
Jul. 21, 2020 (JP) .............................. JP2020-124372

(51) Int. Cl.
*G11B 33/14* (2006.01)
*B01D 46/62* (2022.01)
*B01D 46/00* (2022.01)

(52) U.S. Cl.
CPC ........ *G11B 33/1453* (2013.01); *B01D 46/003* (2013.01); *B01D 46/0036* (2013.01); *B01D 46/62* (2022.01); *G11B 33/146* (2013.01); *B01D 2279/45* (2013.01)

(58) Field of Classification Search
None
See application file for complete search history.

(56) References Cited

U.S. PATENT DOCUMENTS

| | | | |
|---|---|---|---|
| 5,075,807 A | 12/1991 | Inoue et al. | |
| 7,549,272 B2 * | 6/2009 | DeFedericis | B29C 65/7461 53/452 |
| 8,599,515 B2 * | 12/2013 | Brown | B01D 53/261 360/97.16 |
| 8,908,319 B1 * | 12/2014 | Gustafson | G11B 33/1453 360/97.16 |
| 9,418,710 B1 * | 8/2016 | Choe, Jr. | G11B 25/043 |
| 10,276,216 B2 | 4/2019 | Zhang et al. | |
| 10,647,495 B2 * | 5/2020 | Humm | B65D 81/266 |

(Continued)

FOREIGN PATENT DOCUMENTS

JP H10-326476 A 12/1998

*Primary Examiner* — Jefferson A Evans
(74) *Attorney, Agent, or Firm* — Allen & Overy LLP

(57) ABSTRACT

According to one embodiment, a humidity control filter used in a magnetic recording/reproducing apparatus includes a housing that houses a magnetic recording medium and disposed inside the housing and close to a vent connecting the inside of the housing and outside air. The humidity control filter including a water-repellency coating having ventilation, a first adsorption layer of a porous solid having characteristics of type III isotherm according to IUPAC classification, and a second adsorption layer of a porous solid having characteristics represented by type I adsorption isotherm according to the IUPAC classification, which are provided in order from the vent.

8 Claims, 3 Drawing Sheets

(56) References Cited

U.S. PATENT DOCUMENTS

| | | | |
|---|---|---|---|
| 10,839,860 B2* | 11/2020 | Zhang | G11B 5/5521 |
| 2003/0142438 A1* | 7/2003 | Brown | G11B 17/028 |
| | | | 360/97.16 |
| 2013/0044392 A1* | 2/2013 | Brown | G11B 33/1453 |
| | | | 360/97.16 |
| 2013/0044393 A1* | 2/2013 | Brown | G11B 25/043 |
| | | | 360/97.16 |
| 2015/0182878 A1* | 7/2015 | Bultinck | B01D 46/403 |
| | | | 95/287 |
| 2018/0168894 A1* | 6/2018 | Tee, Jr. | A61L 15/28 |
| 2018/0312043 A1* | 11/2018 | Komatsubara | B60H 3/022 |
| 2019/0030455 A1* | 1/2019 | Ren | B01J 20/3236 |
| 2019/0080724 A1* | 3/2019 | Zhang | B01D 46/0031 |
| 2020/0071926 A1* | 3/2020 | Stein | B32B 27/302 |
| 2020/0121521 A1* | 4/2020 | Daniel | A61F 13/537 |
| 2021/0138436 A1* | 5/2021 | Liu | B01J 20/28016 |
| 2021/0370218 A1* | 12/2021 | Daus | B01J 20/18 |

* cited by examiner

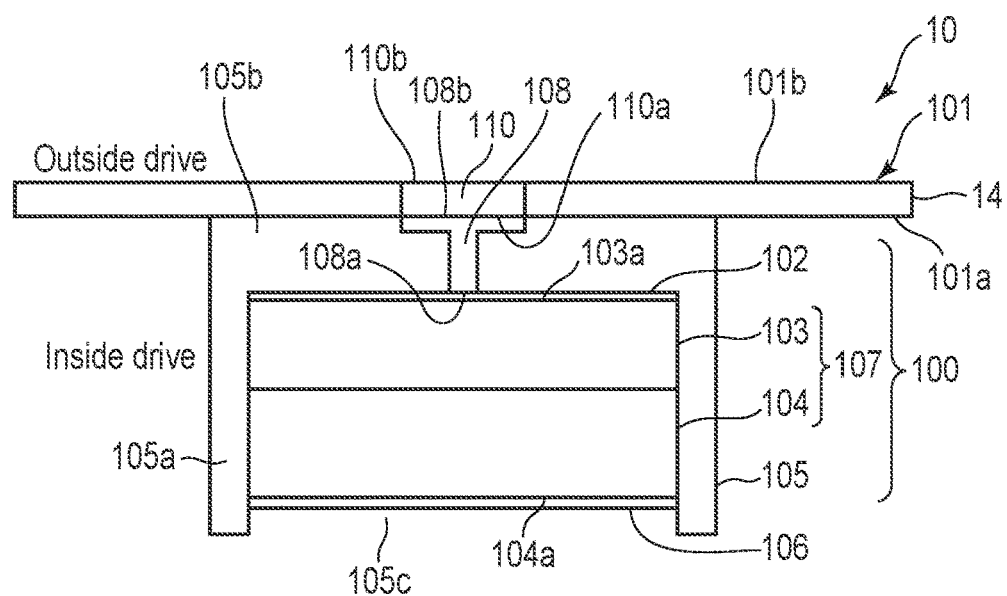
F I G. 1
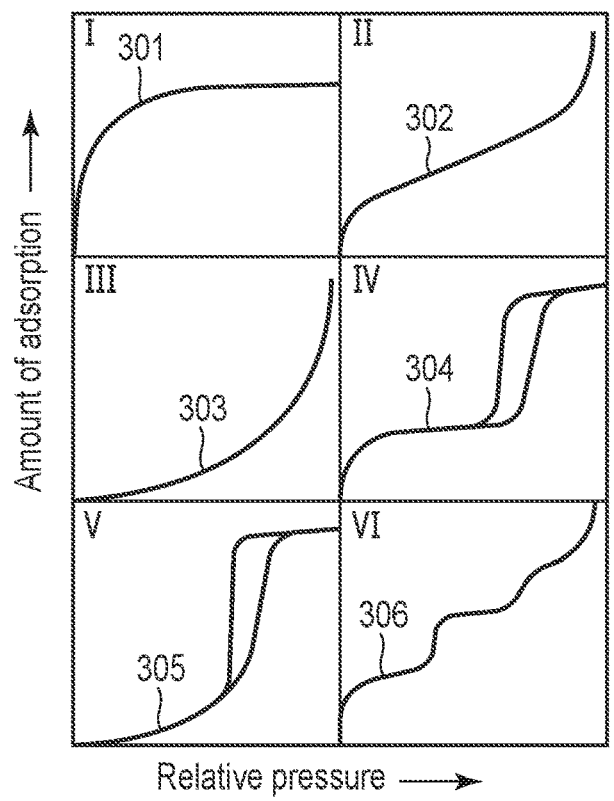
F I G. 2

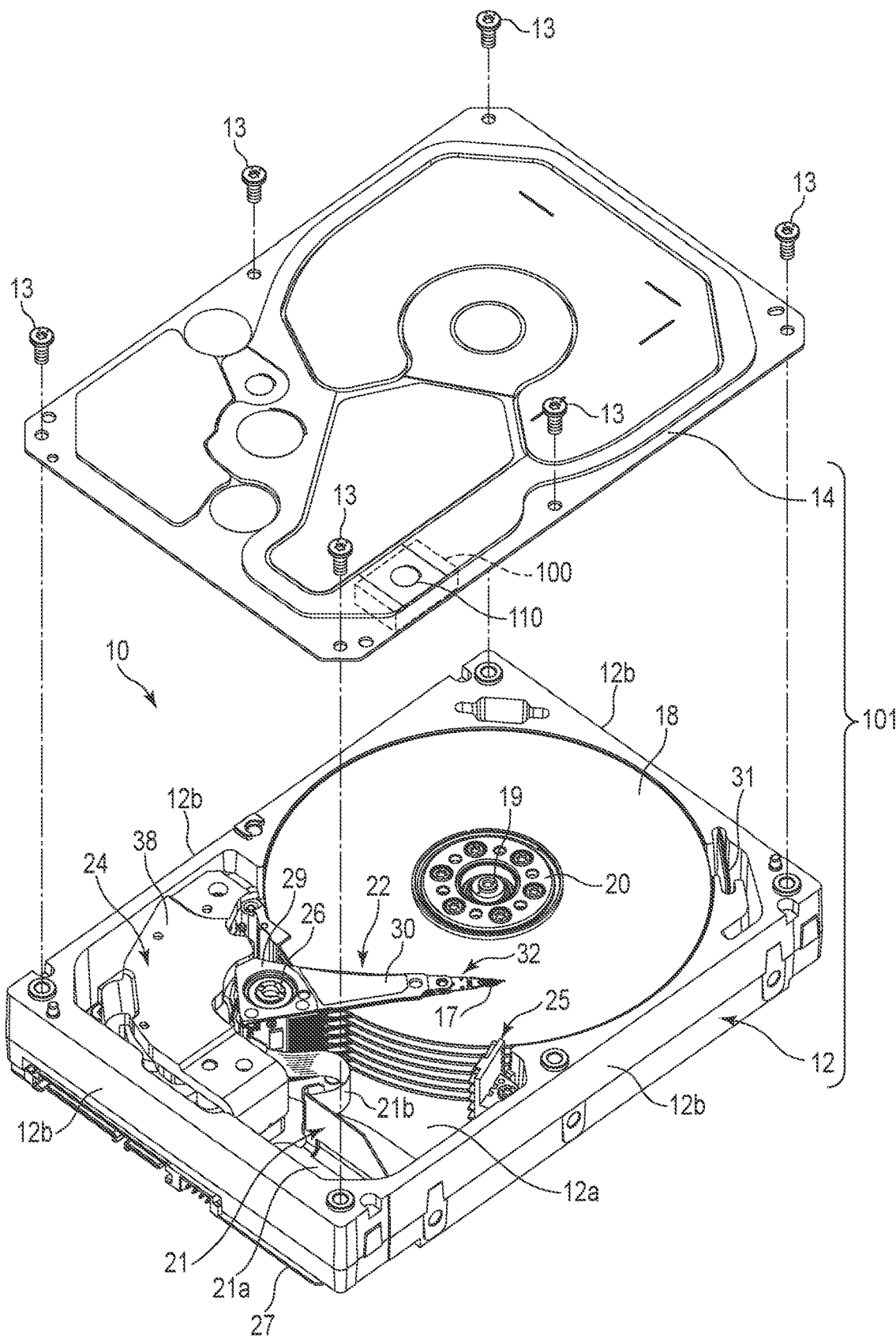
F I G. 5

HUMIDITY CONTROL FILTER AND MAGNETIC RECORDING/REPRODUCING APPARATUS

CROSS-REFERENCE TO RELATED APPLICATIONS

This application is based upon and claims the benefit of priority from Japanese Patent Application No. 2020-124372, filed Jul. 1, 2020, the entire contents of which are incorporated herein by reference.

FIELD

Embodiments described herein relate generally to a humidity control filter and a magnetic recording/reproducing apparatus.

BACKGROUND

In a conventional magnetic recording/reproducing apparatus, humidity gradually increases so as to follow external humidity by the intrusion of moisture from a vent and a gasket attached to a top cover. The magnetic recording/reproducing apparatus is so configured that when the humidity increases, the moisture is removed very slowly from inside the apparatus because the vent is often provided with a diffusing flow path. If the inside of the magnetic recording/reproducing apparatus is at high humidity and its temperature varies, condensation is likely to occur. The vent usually employs a vent filter such as active carbon having humidity controlling characteristics. The vent filter absorbs excess moisture when the inside of the magnetic recording/reproducing apparatus increases in its humidity, but it has no function of discharging moisture positively from inside the apparatus, and it may cause condensation when the filter exceeds its moisture absorption limit.

BRIEF DESCRIPTION OF THE DRAWINGS

FIG. 1 is a sectional view showing a configuration of a humidity control filter according to a first embodiment.

FIG. 2 is a graph showing typical adsorption isotherms according to the IUPAC classification.

FIG. 5 is an exploded perspective view of a magnetic recording/reproducing apparatus according to a second embodiment.

DETAILED DESCRIPTION

Figure 3:
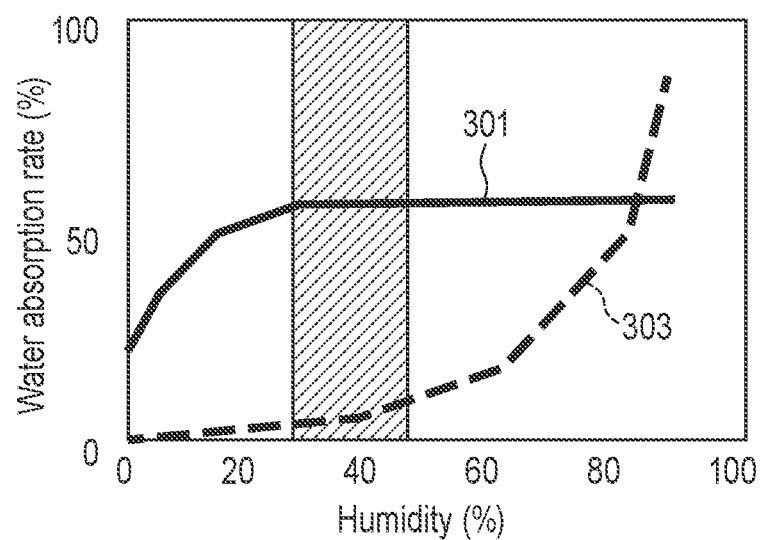
FIG. 3 is a graph showing adsorption isotherms of a porous solid used in the first embodiment.

In general, according to one embodiment, a humidity control filter is used in a magnetic recording/reproducing apparatus including a housing which houses a magnetic recording medium, and can be placed on the inside of the housing and close to a vent connecting the inside of the housing and outside air. The humidity control filter comprises a first adsorption layer of a porous solid having characteristics represented by typical type III adsorption isotherm according to the International Union of Pure and Applied Chemistry (IUPAC) classification, a water-repellency coating film provided with the first adsorption layer on the vent side, and a second adsorption layer of a porous solid having characteristics represented by type I adsorption isotherm according to the IUPAC classification and provided with the first adsorption layer on the inner side of the housing.

Embodiments will be described below with reference to the drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes and the like of the respective parts may be changed and illustrated schematically in the drawings as compared with those in an accurate representation. Constituent elements corresponding to each other in a plurality of drawings are denoted by the same reference numerals and their detailed descriptions may be omitted unless necessary.

FIG. 1 is a sectional view showing a configuration of a humidity control filter according to a first embodiment.

As shown in FIG. 1, a humidity control filter 100 is applicable in, for example, a top cover 14 of a housing 101 of a magnetic recording/reproducing apparatus 10 which houses a magnetic recording medium (not shown). The humidity control filter 100 includes an adsorption layer 103 to which a water-repellency coating 102 is applied, and an adsorption layer 107 to which an adsorption layer 104 adheres.

The water-repellency coating 102 is disposed close to a first opening 110a formed in the inner surface 101a of the housing 101. The first opening 110a is a part of a vent 110 that leads to the outside air from inside the housing 101. The vent 110 connects the first opening 110a to a second opening 110b formed in the outer surface 101b of the housing 101.

The adsorption layer 107 includes two or more adsorption layers, namely, at least a first adsorption layer 103 and a second adsorption layer 104. The second adsorption layer 104 is provided inside the housing 101, that is, inside the magnetic recording/reproducing apparatus 10. The first adsorption layer 103 is provided closer to the outside air than the second adsorption layer 104. The water-repellency coating 102 is provided on the outside-air side of the first adsorption layer 103.

The humidity control filter 100 may include a resin case 105 having a bottom portion 105b, a sidewall portion 105a, and an opening portion 105c opposed to the bottom portion 105b. The case 105 may house the water-repellency coating 102, first adsorption layer 103 and second adsorption layer 104 in order from the bottom portion 105b toward the opening portion 105c. The bottom portion 105b can be disposed close to the first opening 110a, and has a pore 108 as a flow path that can communicate with the first opening 110a. The pore 108 has, for example, a two-stage pore diameter. When the diameter of the first opening 110a is, for example, 1.5 mm, the diameter of an opening 108b of the pore 108 closer to the first opening 110a can be set to 1.5 mm, and the diameter of an opening 108a closer to the water-repellency coating 102 can be set to 0.2 mm. The opening portion of the case 105 can be provided with a ventilatable membrane 106. The membrane 106 can thus cover the surface 104a of the second adsorption layer 104.

The second adsorption layer 104, which is provided inside the magnetic recording/reproducing apparatus 10, is formed of a porous solid having characteristics represented by a type I adsorption isotherm according to the IUPAC classification. The first adsorption layer 103, which is provided closer to the outside air than the porous solid having characteristics represented by a type I, is formed of a porous solid having characteristics represented by a type III adsorption isotherm according to the IUPAC classification.

There are six types I to VI of IUPAC classifications for typical adsorption isotherms.

FIG. 2 shows typical adsorption isotherms according to the IUPAC classification.

In FIG. 2, the vertical axis represents an adsorption rate and the horizontal axis represents relative pressure of water vapor. The adsorption rate here is an amount of water adsorbed with respect to the dead weight. In FIG. 2, curves 301, 302, 303, 304, 305 and 306 indicate type I, type II, type III, type IV, type V and type VI adsorption isotherms, respectively.

FIG. 3 shows type I and type III adsorption isotherms representing a relationship of a water absorption rate versus humidity used in the first embodiment.

The type I adsorption isotherm indicates water absorption characteristics in a region where the humidity is lower than 50%, and the type III adsorption isotherm indicates water absorption characteristics in which the water absorption rate is low when the humidity is low but increases with the increasing humidity.

In the first embodiment, as shown in FIG. 3, moisture can be discharged positively from the magnetic recording/reproducing apparatus 10 by making the above two characteristics compatible.

When the humidity in the magnetic recording/reproducing apparatus 10 gradually increases, a porous solid having adsorption characteristics of the type I isotherms first starts to adsorb moisture (water vapor), as indicated by reference numeral 301. Then, when the amount of water adsorbed by a porous solid having adsorption characteristics based on the type I isotherms reaches about 30% or more, a porous solid having adsorption characteristics based on the type III isotherms adsorbs moisture from the porous solid having adsorption characteristics based on the type I isotherms which is in contact with the porous solid having adsorption characteristics based on the type III isotherms, with the result that the moisture can be moved. As described above, when two layers of porous adsorption solids whose water absorption characteristics vary depending on humidity are used, they act like a pump to remove moisture from inside the magnetic recording/reproducing apparatus 10. In addition, when the first and second adsorption layers 103 and 104 are brought into contact with each other, moisture can be moved from inside to outside a hard disk drive. Although the first and second adsorption layers 103 and 104 are brought into close contact with each other, another layer can be provided between them.

As the materials of porous solids used for the first and second adsorption layers 103 and 104, for example, an inorganic porous solid capable of forming by sintering raw material particles, including pores made of voids between the raw material particles. Active carbon, zeolite and silica gel can be used as the raw materials.

For example, the humidity control filter 100 according to the first embodiment may have a function of promoting the movement of moisture from the second adsorption layer 104 to the first adsorption layer 103 by optionally adjusting the degree of aggregation of particles of a porous solid used for the two-layer adsorption layer 107. For example, when a porous solid of the first adsorption layer 103 is formed, most of the lengths of voids between particles of the porous solid can be set to 50 nm or less, and when a porous solid of the second adsorption layer 104 is formed, most of the lengths of voids between particles of the porous solid can be set to 50 nm or more to form macropores. Moisture can thus be moved from the second adsorption layer 104 having a large void to the first adsorption layer 103 having a small void by a capillary phenomenon. The moisture moved to the first adsorption layer 103 can be transmitted through the water-repellency coating 102 and then discharged to the outside air through the vent 110.

The water-repellency coating 102 is provided closer to the vent 110 than the first adsorption layer 103 and has wettability that is lower than the surface wettability of the first adsorption layer 103. When the outside air containing water vapor comes into contact with the water-repellency coating 102, it is easily condensed into water droplets. Since the water droplets hardly permeate the second adsorption layer, they will be evaporated. When the water-repellency coating 102 is so used, moisture can be prevented from entering the magnetic recording/reproducing apparatus 10 from outside.

As the water-repellency coating 102, as shown in FIG. 1, a coating layer can be formed by spraying or applying a water repellent, such as fluorine-based, silicone-based and hydrocarbon-based water repellents, on the surface of the first adsorption layer 103, for example. In order to obtain ventilation, the thickness of the coating layer can be set less than the particle size of the porous solid to make the coating layer nonuniform and can be adjusted to ensure the ventilation of the water-repellency coating by, for example, a method of forming a nonuniform film or forming the coating layer in a pattern. The water-repellency coating 102 is formed directly on the surface of the first adsorption layer 103, but another layer can be formed between the first adsorption layer 103 and the water-repellency coating 102.

Figure 4:
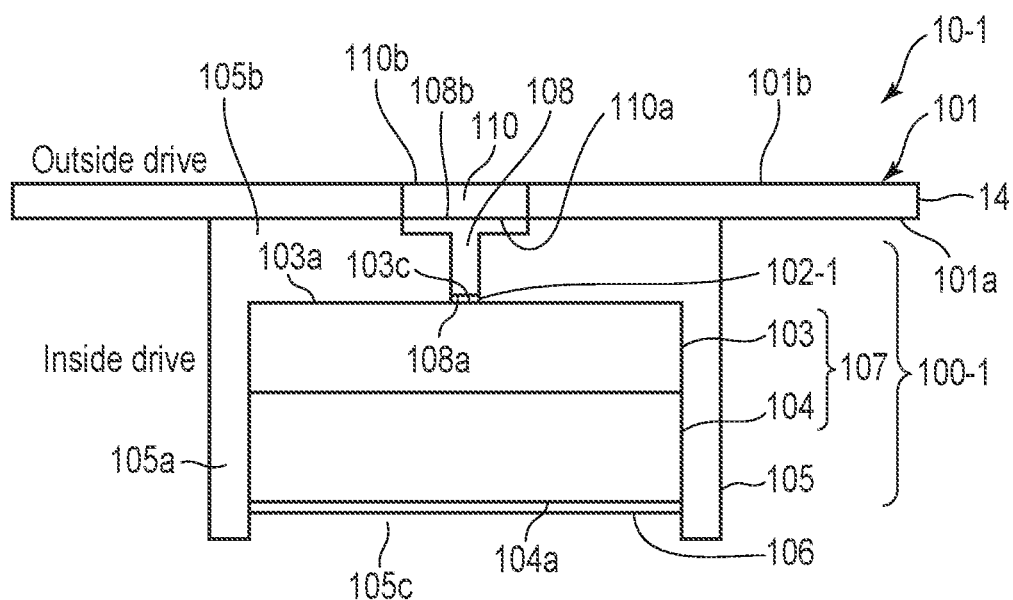
FIG. 4 is a sectional view of a modification to the first embodiment shown in FIG. 1.

FIG. 4 shows a modification to the first embodiment shown in FIG. 1.

FIG. 4 shows a humidity control filter 100-1, which is applicable in, for example, a top cover 14 of a housing 101 of a magnetic recording/reproducing apparatus 10-1 which houses a magnetic recording medium (not shown). The humidity control filter 100-1 can be provided with a water-repellency coating 102-1 on a part of the surface 103a of a first adsorption layer 103 close to a first opening 110a, for example, on a region 103c that is in contact with the outside air supplied from at least the first opening 110a. In addition, the humidity control filter 100-1 has the same configuration as shown in FIG. 1, except that instead of the water-repellency film 102, a water-repellency coating 102-1 is provided on a part of the surface of the first adsorption layer 103. If the water-repellency coating 102-1 is provided on the region 103c, the following significant advantage can be obtained. When the outside air containing water vapor comes into contact with the water-repellency coating 102, it condenses into water droplets. Since the water droplets hardly permeate a second adsorption layer, they can be evaporated and discharged from the vent.

According to the first embodiment, the humidity in the magnetic recording/reproducing apparatus can be suppressed in the vent. Furthermore, according to the first embodiment, the humidity in the magnetic recording/reproducing apparatus can be prevented from increasing under high humidity environment to avoid a risk of causing condensation.

The membrane 106 is a nonwoven fabric used to hold the adsorption layer 107 of porous solids in the case 105.

Instead of the membrane, a ventilatable housing having an opening and a flow path can be provided.

Below is a detailed description of a hard disk drive (HDD) according to a second embodiment, which is used as a magnetic recording/reproducing apparatus.

FIG. 5 is an exploded perspective view of a magnetic recording/reproducing apparatus according to the second embodiment, from which a top cover is removed.

An HDD as the magnetic recording/reproducing apparatus 10 includes a flat, substantially rectangular housing 101. The housing 101 includes a rectangular box-shaped base 12 with an opening on its top surface and a top cover 14. The base 12 includes a rectangular bottom wall 12a opposed to the top cover 14 with a gap therebetween and a side wall 12b standing along the periphery of the bottom wall, and is formed integrally with them by, for example, aluminum. The top cover 14 is formed like a rectangular plate by, for example, stainless steel. The top cover 14 is screwed onto the side wall 12b of the base 12 by a plurality of screws 13 to close the opening on the top surface of the base 12.

The housing 101 includes a plurality of magnetic disks 18 as disk-like recording media and a spindle motor 19 that supports and rotates the magnetic disks 18. The spindle motor 19 is disposed on the bottom wall 12a. Each of the magnetic disks 18 is formed to have a diameter of, for example, 88.9 mm (3.5 inches), and has a magnetic recording layer on its top surface or undersurface. The magnetic disks 18 are coaxially fitted to a hub (not shown) of the spindle motor 19 and clamped by a clamp spring 20 to be fixed to the hub. Thus, each of the magnetic disks 18 is supported in a state parallel to the bottom wall 12a of the base 12. Each of the magnetic disks 18 is rotated at a predetermined number of rotations by the spindle motor 19.

As shown in FIG. 5, in the second embodiment, for example, seven magnetic disks 18 are arranged in the housing 101, but the number of magnetic disks 18 is not limited to seven.

The housing 101 includes a plurality of magnetic heads 17 that record and reproduce information to and from the magnetic disks 18, and an actuator assembly 22 that supports the magnetic heads 17 movably to the magnetic disks 18. The housing 101 also includes a voice coil motor (VCM) 24 that rotates and positions the actuator assembly 22, a ramp load mechanism 25 that holds the magnetic heads 17 in an unload position separated from the magnetic disks 18 when the magnetic heads 17 move to the outermost peripheries of the magnetic disks 18, and a board unit (FPC unit) 21 mounted with electronic components such as a conversion connector.

A printed circuit board 27 is screwed on the outer surface of the bottom wall 12a of the base 12. The printed circuit board 27 includes a control unit which controls the operation of the spindle motor 19 and also controls the operations of the VCM 24 and magnetic heads 17 via the board unit 21.

The actuator assembly 22 includes an actuator block 29, a plurality of, e.g., eight arms 30 extending in the same direction from the actuator block 29, and a plurality of head gimbal assemblies (HGA) 32 attached to their respective extended ends of the arms 30. The actuator block 29 is rotatably supported by a support shaft (axis) 26 standing on the bottom wall 12a via a unit bearing. Each of the HGAs 32 includes a suspension (load beam) extending from the arm 30, a flexure (wiring member) (not shown) disposed on the load beam and the arm 30, and a magnetic head 17 mounted on a gimbal portion of the flexure.

The actuator assembly 22 further includes a support frame (not shown) extending from the actuator block 29 in a direction opposite to the arm 30, and a voice coil attached to the support frame. The voice coil is located between a pair of yokes 38 placed on the bottom wall 12a to form the VCM 24 together with the yokes 38 and a magnet fixed to one of the yokes 38.

The FPC unit 21 includes a main body 21a formed of a flexible printed circuit board, and the main body 21a is fixed to the bottom wall 12a of the base 12. Electronic components such as a conversion connector are mounted on the main body 21a. The conversion connector penetrates the bottom wall 12a and is connected to the printed circuit board 27. The FPC unit 21 includes a relay flexible printed circuit board (hereinafter referred to as a relay FPC) 21b extending from the main body 21a. The extended end portion of the relay FPC 21b is attached to the side surface (placement surface) of the actuator block 29. The extended end portion of the relay FPC 21b is electrically connected to the magnetic heads 17 via the foregoing flexure.

According to the second embodiment, the HDD further includes a humidity control filter 100 in the housing 101, and the humidity control filter 100 includes an adsorption layer 107. As one example, the humidity control filter 100 is fixed to the inner surface of the top cover 14. As the humidity control filter 100, the humidity control filter 100 shown in FIG. 1 can be used. As a modification to the HDD, the humidity control filter 100-1 shown in FIG. 4 can be used in place of the humidity control filter 100.

In the housing 101, the humidity control filter 100 is provided close to the side wall 12b and outside the magnetic disks 18. The adsorption layer 107 adsorbs moisture that has entered the housing 101.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A humidity control filter used in a magnetic recording/reproducing apparatus including a housing that houses a magnetic recording medium and disposed inside the housing and close to a vent, the vent is provided with the housing and connects the inside of the housing and outside air,
   wherein the humidity control filter comprising:
   a water-repellency coating having ventilation;
   a first adsorption layer of a porous solid having characteristics represented by type III adsorption isotherm according to IUPAC classification; and
   a second adsorption layer of a porous solid having characteristics represented by type I adsorption isotherm according to the IUPAC classification,
   wherein the water-repellency coating includes a coating layer provided on a surface of the first adsorption layer, which is closer to the vent.

2. The humidity control filter of claim 1, wherein the first adsorption layer is in contact with the second adsorption layer.

3. The humidity control filter of claim 1, wherein the first adsorption layer includes a large number of particles, and most of voids between the particles have lengths of 50 nm or less.

4. The humidity control filter of claim 1, wherein the second adsorption layer includes a large number of particles, and most of voids between the particles are macropores which have lengths of 50 nm or more.

5. A magnetic recording/reproducing apparatus including a magnetic recording medium, a housing which houses the magnetic recording medium and has a vent, the vent is provided with the housing and connects the inside of the housing and outside air, and a humidity control filter disposed inside the housing and close to the vent,
    wherein the humidity control filter comprises:
    a water-repellency coating having ventilation;
    a first adsorption layer of a porous solid having characteristics represented by type III adsorption isotherm according to IUPAC classification; and
    a second adsorption layer of a porous solid having characteristics according to the IUPAC classification,
    wherein the water-repellency coating includes a coating layer provided on a surface of the first adsorption layer, which is closer to the vent.

6. The magnetic recording/reproducing apparatus of claim 5, wherein the first adsorption layer is in contact with the second adsorption layer.

7. The magnetic recording/reproducing apparatus of claim 5, wherein the first adsorption layer includes a large number of particles, and most of voids between the particles have lengths of 50 nm or less.

8. The magnetic recording/reproducing apparatus of claim 5, wherein the second adsorption layer includes a large number of particles, and most of the of voids between the particles are macropores having lengths of 50 nm or more.

\* \* \* \* \*